(12) United States Patent
Glenn

(10) Patent No.: US 12,165,177 B2
(45) Date of Patent: Dec. 10, 2024

(54) METHOD AND APPARATUS FOR FACILITATING ONLINE VEHICLE DONATIONS

(71) Applicant: Anthony R. Glenn, Laguna Beach, CA (US)

(72) Inventor: Anthony R. Glenn, Laguna Beach, CA (US)

(*) Notice: Subject to any disclaimer, the term of this patent is extended or adjusted under 35 U.S.C. 154(b) by 498 days.

(21) Appl. No.: 17/532,224

(22) Filed: Nov. 22, 2021

(65) Prior Publication Data

US 2022/0084081 A1    Mar. 17, 2022

Related U.S. Application Data

(63) Continuation-in-part of application No. 16/913,668, filed on Jun. 26, 2020, now abandoned, which is a continuation-in-part of application No. 15/979,151, filed on May 14, 2018, now abandoned.

(60) Provisional application No. 62/508,988, filed on May 19, 2017.

(51) Int. Cl.
*G06Q 30/00* (2023.01)
*G06Q 30/02* (2023.01)
*G06Q 30/0279* (2023.01)
*G06Q 30/08* (2012.01)

(52) U.S. Cl.
CPC ..... *G06Q 30/0279* (2013.01); *G06Q 30/0278* (2013.01); *G06Q 30/08* (2013.01)

(58) Field of Classification Search
None
See application file for complete search history.

(56) References Cited

U.S. PATENT DOCUMENTS

| | | | |
|---|---|---|---|
| 8,108,268 B1* | 1/2012 | Andrews | G06Q 30/0611 705/26.7 |
| 2004/0111281 A1 | 6/2004 | Witter | |
| 2004/0181468 A1 | 9/2004 | Harmon et al. | |
| 2008/0114663 A1 | 5/2008 | Watkins et al. | |
| 2011/0071907 A1 | 3/2011 | Lewis | |
| 2014/0032430 A1* | 1/2014 | Sieger | G06Q 50/18 705/311 |
| 2015/0206202 A1* | 7/2015 | Meadow | G06Q 40/06 705/36 R |
| 2018/0336602 A1 | 11/2018 | Glenn | |
| 2020/0327583 A1 | 10/2020 | Glenn | |

OTHER PUBLICATIONS

ProQuest "Search Strategy from ProQuest Oct. 23, 2019 12:58" Oct. 23, 2019; 3 pages; ProQuest LLC.

* cited by examiner

*Primary Examiner* — Mila Airapetian
(74) *Attorney, Agent, or Firm* — NGUYEN TARBET IP LAW

(57) ABSTRACT

The present technology generally relates to online donations, and more particularly, to a method and apparatus for facilitating online vehicle donations.

1 Claim, 9 Drawing Sheets

METHOD AND APPARATUS FOR FACILITATING ONLINE VEHICLE DONATIONS

CROSS-REFERENCES TO RELATED APPLICATIONS

This application is a continuation-in-part, and claims benefit of U.S. patent application Ser. No. 16/913,668, filed Jun. 26, 2020, which is a continuation-in-part and claims benefit of U.S. patent application Ser. No. 15/979,151 filed May 14, 2018, which is a non-provisional and claims benefit of U.S. Patent Application Ser. No. 62/508,988 filed May 19, 2017, the specification(s) of which is/are incorporated herein in their entirety by reference.

TECHNICAL FIELD

The present technology generally relates to online donations, and more particularly, to a method and apparatus for facilitating online vehicle donations.

BACKGROUND

Organizations, nowadays, seek donations online. These organizations may include non-profit organizations, non-governmental organizations (NGOs), focus groups, charitable institutions, private or public enterprises, and the like. The donations may be sought for a cause, such as for example, for Wildlife conservation, for developing programs for preventing malnutrition in underprivileged children, for rehabilitating individuals suffering from trauma, and the like. In some example scenarios, the donations may be sought for a building a school, a hospital or even a religious center. Nowadays, with the advent of crowd funding platforms, enterprises may seek donations for addressing common concerns, like studying climate change, building technology for tapping a higher percentage of solar power, developing a cure for cancer, and the like. The various organizations/enterprises seeking donations are collectively referred to hereinafter as fundraising entities.

Typically, Websites or online platforms supporting fundraising activities enable donors to make monetary donations using their credit cards, debit cards, online payment systems like PAYPAL®, and the like. However, such platforms do not provide the donors with an option to donate their vehicles for raising funds. Therefore, a donor may need to undergo a time consuming process involving valuing the vehicle, searching for a prospective buyer, making arrangements for the prospective buyers to inspect the vehicle, completing the financial transaction and thereafter donating the funds to a fundraising entity of choice. Such a cumbersome process may prevent many potential donors from monetarily supporting causes of their choice.

Accordingly, there is a need to enable donors to donate their vehicles and contribute the funds raised to the causes of their choice. Further, there is a need to create a completely online process for vehicle donation to reduce an amount of effort required on part of the donor, in selling a vehicle and contributing the funds raised through the sale of the vehicle to the chosen cause.

BRIEF DESCRIPTION OF THE FIGURES

For a more complete understanding of example embodiments of the present invention, reference is now made to the following descriptions taken in connection with the accompanying drawings in which.

Figure 1:
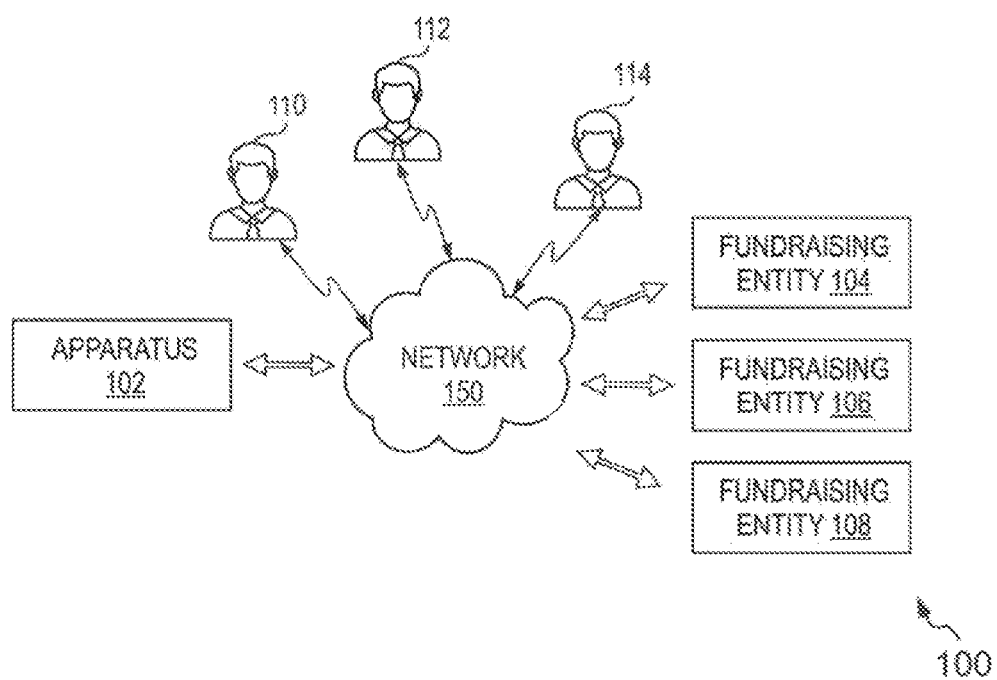
FIG. 1 shows an example representation of an environment for facilitating online vehicle donation, in accordance with an example embodiment of the invention.

The drawings referred to in this description are not to be understood as being drawn to scale except if specifically noted, and such drawings are only exemplary in nature.

DETAILED DESCRIPTION

The best and other modes for carrying out the present invention are presented in terms of the embodiments, herein depicted in FIGS. 1 to 10. The embodiments are described herein for illustrative purposes and are subject to many variations. It is understood that various omissions and substitutions of equivalents are contemplated as circumstances may suggest or render expedient, but are intended to cover the application or implementation without departing from the spirit or the scope of the present invention. Further, it is to be understood that the phraseology and terminology employed herein are for the purpose of the description and should not be regarded as limiting. Any heading utilized within this description is for convenience only and has no legal or limiting effect. The terms "a" and "an" herein do not denote a limitation of quantity, but rather denote the presence of at least one of the referenced item.

The present invention discloses a method and apparatus for facilitating online vehicle donation. Currently, no mechanism exists to accept vehicle donations and complete the entire vehicle donation process online. A phone call or an email is still required at some point with the donor (to confirm vehicle details, schedule towing, sign DMV papers, etc.). Various embodiments disclosed herein provide a platform-agnostic utility for accepting vehicle donations available to any entity wishing to raise funds. Fundraising entities, like crowdfunding platforms have several millions of monthly users visiting their sites with an intention to support (for example, by way of donation) any number of causes running campaigns on these platforms. The present invention provides these donors with an option of donating their vehicles to support any cause they wish to support.

Such an option will enable the average donation value to grow, and the fundraising platforms and the causes can raise more money.

In an embodiment, if a donor indicates a willingness to donate a vehicle, then a UI is provided to the donor to input vehicle data, such as model year of the vehicle, make of the vehicle, condition of the vehicle, and the like. A vehicle's donation value is calculated using an algorithm that compares provided data to existing, recent, regionally-specific wholesale auction data. Thereafter, expected costs (Towing, DMV transfer, auction fees and administration fee, etc.) are deducted from the vehicle's projected sales value and a net donation value is returned to the donor for his/her approval. Further, based on the acceptance of the value presented to the donor, the pickup and sale of the vehicle is facilitated, for example by organizing various fundraising activities/events such as auctions. Factors such as the location of the donor, current market value of the vehicle, evaluation of the actual condition of the vehicle compared to the information provided by the donor and the like, are considered before organizing the sale. The amount received from the sale of the donated vehicle is transferred to the fundraising entity for raising the funds towards the choice of the cause selected by the donor.

FIG. 1 shows an example representation of an environment 100 for facilitating online vehicle donation, in accordance with an example embodiment of the invention. The environment 100 is depicted to include an apparatus 102, a plurality of online fundraising entities, such as fundraising entities 104, 106 and 108, and a plurality of donors, such as donors 110, 112 and 114. The term 'online fundraising entity' or 'fundraising entity' as interchangeably used herein refers to any non-profit organization, non-governmental organization (NGO), focus group, charitable institution, private enterprise or public enterprise, seeking online donations from prospective donors. The environment 100 is exemplarily depicted to display only three fundraising entities, however, it is noted that the environment 100 may include fewer or more fundraising entities. The fundraising entities may seek donations for a variety of purposes, such as for example for raising awareness on societal issues, for identifying solutions to common problems, for providing assistance to the needy, and the like.

The fundraising entities may set up a Website, a Web portal or may collaborate with a crowd funding platform to serve as the online or Web interface for receiving donations from the donors. The donors may use their respective electronic devices to access the online/Web interface of their chosen fundraising entity over a communication network, such as a network 150. The network 150 may include wired networks, wireless networks and combinations thereof. Some non-limiting examples of the wired networks may include Ethernet, local area networks (LANs), fiber-optic networks, and the like. Some non-limiting examples of the wireless networks may include cellular networks like GSM/3G/4G/5G/LTE/CDMA networks, wireless LANs, Bluetooth, W-Fi or ZigBee networks, and the like. An example of the combination of wired and wireless networks may include the Internet. Accordingly, the donors 110-114 may access the online interface of the fundraising entities over the network 150 and make online donations to their chosen causes promoted by the fundraising entities.

The apparatus 102 is configured to support online donation seeking activities of the fundraising entities by enabling the donors to donate their respective vehicles. To that effect, the apparatus 102 is configured to be in operative communication with the various Websites and/or crowdfunding platforms supporting raising of funds. The apparatus 102 may be embodied as remote machine, such as for example a Web server, including computer program instructions configured to facilitate online vehicle donation. In at least one example embodiment, the apparatus 102 may cause display of an option (for example, in form of a widget, overlay or an icon) to donate vehicle, on the online interface of the fundraising entity. An example widget displayed on a UI associated with a crowd funding platform is shown in FIG. 2.

Figure 2:
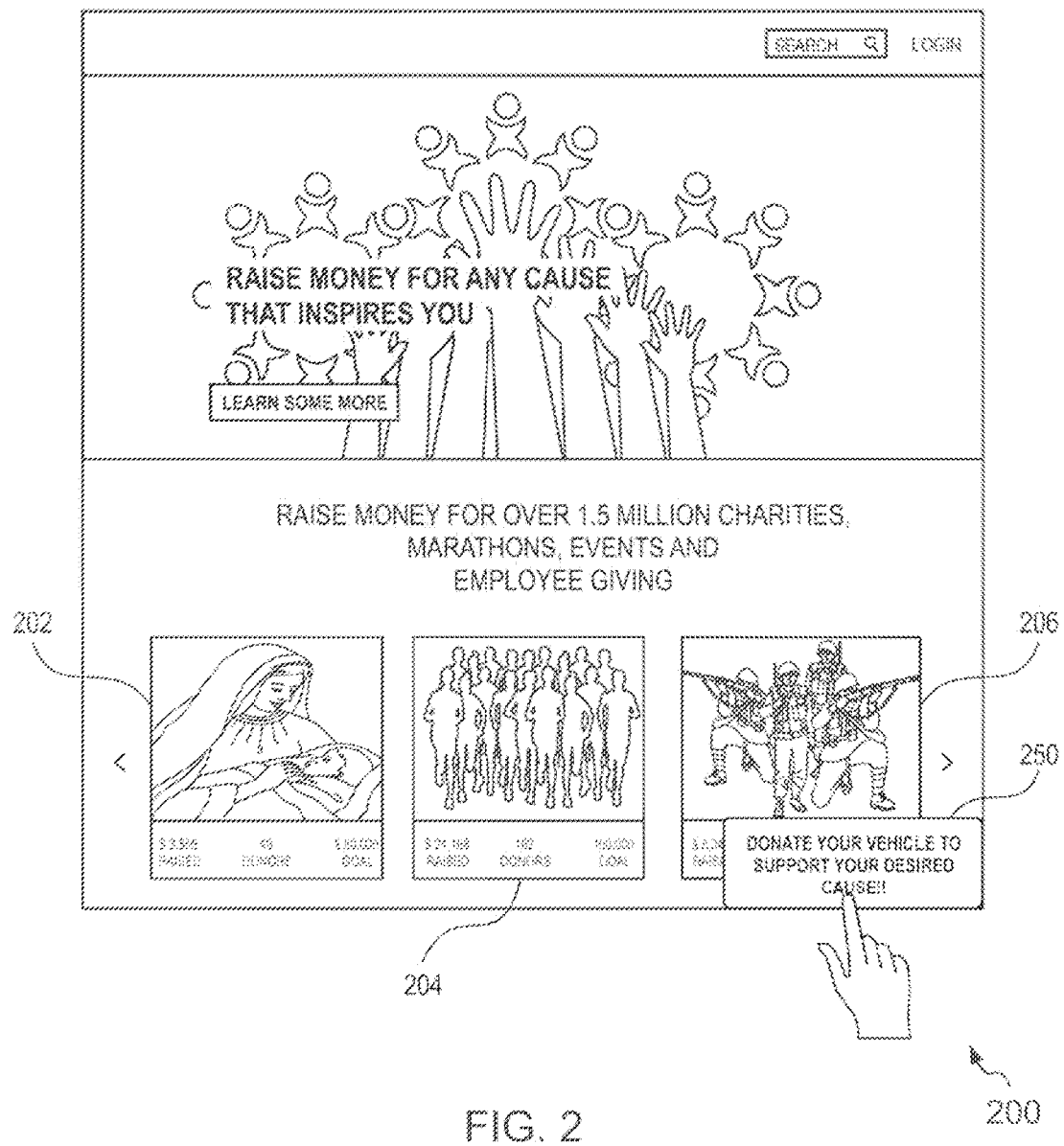
FIG. 2 shows an example representation of a user interface (UI) associated with a crowd funding platform, in accordance with an example embodiment of the invention.

Referring now to FIG. 2, an example representation of a user interface (UI) 200 associated with a crowd funding platform is shown, in accordance with an example embodiment of the invention. The UI 200 may be displayed to existing and prospective donors on their respective electronic devices subsequent to the donors accessing the crowd funding platform over a communication network. It is noted that the crowd funding platform may include several UIs in addition to the UI 200. For example, in addition to the UI 200, the crowd funding platform may at least include one UI for each individual cause for which donation is sought.

The UI 200 is depicted to display several causes that a donor may donate funds to. For example, the UI 200 is exemplarily shown to depict clickable images 202, 204, 206 seeking donations for a program for assisting children suffering from malnutrition, a marathon event, and soldiers in war, respectively. A click input on the image from a prospective donor may cause display of another UI associated with a payment gateway for enabling the donor to make a monetary donation to the corresponding cause. The images are also depicted to display an amount of donations collected so far, number of donors who have contributed to the cause so far, and a target amount of donation to be collected for the cause.

Additionally, the UI 200 depicts a widget 250 displaying text 'Donate your vehicle to support your desired cause!!' It is noted that such a widget may be displayed on each UI associated with the crowd funding platform. A prospective donor wishing to donate his or her vehicle may provide a click or a touch input on the widget 250 to initiate the process of vehicle donation. In an embodiment, the provisioning of a click or touch input on the widget 250 may cause provisioning of an individual or list of causes and/or campaigns for which donations are sought by the fundraising entities on the UI 200. The various causes may be displayed in a free form, drop-down menu form and/or checkbox-form for the donor to select one or more causes he/she wishes to support. Alternatively, in some embodiments, a list of causes for which donations are sought may be initially presented to the donor to select one or more causes he/she wishes to support. After receiving a selection of a cause to support, the donor may click the widget 250 to donate the vehicle.

In at least one example embodiment, the provisioning of the donor input corresponding to the widget 250 may cause one or more application programming interface (API) calls to the apparatus 102 (shown in FIG. 1). In an embodiment, the apparatus 102 may associate a Hyperlink Text Markup Language (HTML) tag or a JavaScript tag with the widget 250, which may be activated upon receiving a user input. The activation of the tag may be configured to generate API calls to the apparatus 102. The API calls may be embodied in form of a data signal capable of being securely transmitted over a communication network, such as the communication network 150. The apparatus 102 upon receiving such a communication may be configured to cause display of another UI capable of enabling the donor to provide details of the vehicle to be donated. The display of such an UI may be effected in substantially real-time (for example, in the order of milliseconds) subsequent to the provisioning of a donor input on the widget 250. An exemplary UI displayed to the donor is explained next with reference to FIG. 3.

Figures 3, 4:
FIG. 3 shows an example representation of a UI displayed to the donor for enabling the donor to provide details of the vehicle to be donated, in accordance with an example embodiment of the invention.
FIG. 4 shows an example representation of a UI showing a net donation value of the vehicle to the donor, in accordance with an example embodiment of the invention.

Referring now to FIG. 3, an example representation of a UI 300 displayed to the donor for enabling the donor to provide details of the vehicle to be donated is shown, in accordance with an example embodiment of the invention. The UI 300 may be presented to the donor in response to receiving a donor input corresponding to a widget offering an option to donate a vehicle, such as the widget 250 explained with reference to FIG. 2.

The UI 300 is depicted to display form fields 302, 304, 306, 308, 310 and 312 for receiving donor input corresponding to vehicle's model year, make, model, trim, mileage and zip code. Further, the UI 300 depicts another form field in form of a rating option 314 capable of receiving a click or a touch input from the donor to capture the donor's assessment of the condition of the vehicle. More specifically, the rating option 314 displays five stars, and the donor may provide an input to select a number of stars that corresponds to the donor's assessment of the condition of the vehicle. In an embodiment, selection of five stars may imply that the vehicle is in excellent condition and lower rating of stars may imply progressively inferior condition of the vehicle. For example, the selection of one star may imply that the vehicle is in poor condition and that the vehicle needs substantial restoration effort or has a salvaged title. In an illustrative example, the donor may click on the third star to select a three star input, implying that the vehicle is in a good condition with average wear and tear and does not require repairs or restoration effort on the behalf of the buyer. It is noted that the UI 300 may include other mechanisms for receiving donor input corresponding to the donor's assessment of the condition of the vehicle. For example, the UI 300 may display a sliding scale and the donor may slide the scale to rate the condition of the vehicle on a scale of 1 to 5, with rating of 1 being the highest rating and 5 being the lowest rating. Alternatively, the UI 300 may include a form field, such as the other form fields 302 to 312, capable of receiving a numerical input corresponding to the donor rating on a scale of 1 to 5. In other embodiments, the present invention may implement a 4-category ranking system for determining a quality of the donation (poor, fair, good, excellent).

In an illustrative example, the donor may enter the following information related to his car which he/she wishes to donate:

Vehicle Model year—2005
Vehicle Make—Nissan
Vehicle Model—Quest
Vehicle Trim—Minivan 4D
Vehicle Mileage—80,000 miles
Zip code—20148
Condition of the Vehicle—Five stars (i.e. excellent)
After entering the information, the donor may click a button 350 labeled 'Submit'.

The UI 300 including form fields 302 to 314 is depicted herein for illustration purposes and the present invention is not limited to these form fields. Indeed, the UI 300 may include more or fewer form fields. For example, the UI 300 may include form fields enabling the donor to provide an email address or contact number so that a representative from the fundraising entity may contact the donor in case further information related to the vehicle or the donor is required. Alternatively, in an embodiment, after clicking the button 350, the donor may be redirected to another UI requesting the donor to enter information such as address and preferred time so that a representative may visit the donor to receive information related to the vehicle or inspect the vehicle in person. Moreover, in some embodiments, one or more form fields may be implemented as free form text boxes or the form fields may include drop-down menus or may be associated with check-boxes to enable user selection of options.

In at least one example embodiment, the apparatus 102 may be configured to receive the details provisioned by the donor as input into the form fields 302-314 upon selection of the button 350, and compute an estimate of a sale value of the vehicle. In an embodiment, the apparatus 102 may be in operative communication with databases, which maintain recent, regional & vehicle-specific wholesale auction sales transaction data from some or all data sources including but not limited to: Manheim Market Report (MMR), Kelly Blue Book (KBB), Insurance Auto Auctions (IAA), NADA Guides, Black Book, and the like. In some embodiments transaction data from both public and private data sources may be fetched to complement the information available in the databases. The apparatus 102 may be configured to perform a scrub of the donor-provided vehicle data against the available transaction data to compute the estimate of the sale value of the vehicle.

In some embodiments, a sale value for the vehicle may be calculated by averaging transaction data available from the various data sources and adjusting the value for regional variances, auction specifics, etc. to determine the projected gross sale price. Further, various expenses such as expenses related to arranging a pickup of the vehicle, transferring an ownership title of the vehicle, auctioning the vehicle (if the vehicle is to be sold through auction activity), and the like may be deducted from the projected gross sale price of the vehicle and a net donation value of the vehicle may be generated. For example, a fixed fee of 100 US Dollars (USD) towards pickup (or towing) expenses, a fixed fee of 55 USD towards title transfer expenses, a percentage of the projected gross sale price as administration fees and fees for conducting the auction may be deducted from the projected gross sales price to compute the net donation value of the vehicle. In an embodiment, the donor may be displayed a placeholder Web page/UI that displays an informative video outlining process of vehicle valuation and disclaimers while the net donation value of the vehicle is being computed at the back-end. The apparatus 102 is configured to generate a complete record and a transaction ID in the Customer Relationship Management (CRM) database upon completing the computation of the net donation value. In an embodiment, the net donation value may be displayed to the donor and the donor may be provided with an option to proceed with the vehicle donation or cancel the vehicle donation. In some embodiments, an educational video showing answers to common questions and a few additional disclosures may also be displayed to the donor. A UI displaying the net donation value to the donor is depicted in FIG. 4.

Referring now to FIG. 4, an example representation of a UI 400 showing a net donation value of the vehicle to the donor is shown, in accordance with an example embodiment of the invention. As explained with reference to FIG. 3, a projected sale value of the vehicle may be computed by the apparatus 102 by scrubbing the vehicle data provided by the donor against transaction data stored in databases. The various expenses associated with selling the vehicle may then be deducted from the sale value to compute the net donation value of the vehicle. The computed net donation value may be displayed by the apparatus 102 to the user as depicted in FIG. 4. More specifically, the apparatus 102 causes display of UI 400 showing a message 402 stating 'Congratulations!! Net Donation Value for your Nissan Quest Minivan is $3,613. Proceed to Donate your Vehicle?' Three buttons 404, 406 and 408 displaying text 'Yes', 'No' and 'Think it Over', respectively, are depicted to be displayed below the message 402 offering options to proceed with donation of the vehicle, to cancel the donation of the vehicle and to act upon the decision to donate at a later point in time. In some embodiments, the apparatus 102 may display a message stating "OC United Way thanks YOU!" The apparatus 102 may display the computed new donation value along with the projected sale value and the plurality of expenses. The apparatus 102 may display a stock paragraph offering company information.

In an embodiment, when the donor clicks on the button 406 (i.e. chooses not to donate the vehicle), a thank you message may be displayed and the donor may be requested to provide reasons for canceling the donation. In some embodiments, the donor upon selecting the button 406, may be provisioned a link to a tip's and tricks page including information related to best practices on selling the vehicle. Further, the donor may be directed to a third party Website such as those related to Autotrader, Kelly Blue Book, etc. for directly selling the vehicle through them. If the donor chooses not to proceed with donating the vehicle, then the donor may be redirected to the originating page on the crowd funding platform, such as for example to the UI 200 explained with reference to FIG. 2.

If the donor provides an input corresponding to the button 408 (i.e. 'Think it Over' option), then the donor may be provided with an option to create a profile where all the information related to the vehicle may be saved for a period of time and the donor may return any time within that time period to complete the donation process.

In an embodiment, when the donor clicks on the button 404 (i.e. chooses to donate the vehicle), a congratulation message may be displayed and the donor may be requested to complete vehicle donation process. In an example embodiment, the donor may be directed to a Web page/LA requesting the donor to enter further information related to the vehicle to be donated such as, but not limited to, Vehicle Identification Number (VIN), license plate number, color, accident history, insurance details, photos, videos and the like. In another example embodiment, the donor may be requested to fill an optional online condition report of the vehicle and upload vehicle documents such as the title, registration, etc. In an embodiment, the contact information of the donor may be used for follow-up sessions such as fixing the vehicle pickup/towing schedules, and the like. The apparatus 102 may further be configured to assign a stock number to the vehicle and a transaction ID to the donor and the information may be stored in the CRM (Customer Relation Management) database associated with the apparatus 102.

In some example embodiments, the apparatus 102 may be configured to cause display of information, explaining how contribution of the vehicle donation is linked to fund raising and disclaimer information related to computing the net donation value of the vehicle to be donated by the donor, Such information may be displayed in the form a video. Alternatively, a chat window may be offered to the donor to chat with the representative to answer queries of the donor.

In an embodiment, when the donor chooses to donate the vehicle and provides an acceptance by selecting the button 404, the apparatus 102 may be configured to receive such a selection and initiate a series of activities, such as for example: (1) appending the donor's record in the CRM; (2) updating any additional vehicle data provided by the donor; (3) determining which auction location/call center the vehicle should be assigned to; and (4) creating and assigning tasks for the selected auction location/call center. Some non-limiting examples of the tasks assigned to the call center may include calling or emailing the donor, arranging document review, scheduling towing of the car and vehicle landing time at the auction location, and the like. The apparatus 102 may also be configured to assist in arranging for inspection of the vehicle's condition and reconciling the actual condition with the donor's assessment. The apparatus 102 may also be caused to determine a minimum bid by scrubbing recent auction records. The vehicle may then be readied for auction, sold to a buyer and funds obtained in return of vehicle transfer. The actual auctioning of the vehicle may be performed at a physical auction site or online. The online auctioning of the vehicle is exemplarily explained with reference to FIG. 5.

Figure 5:
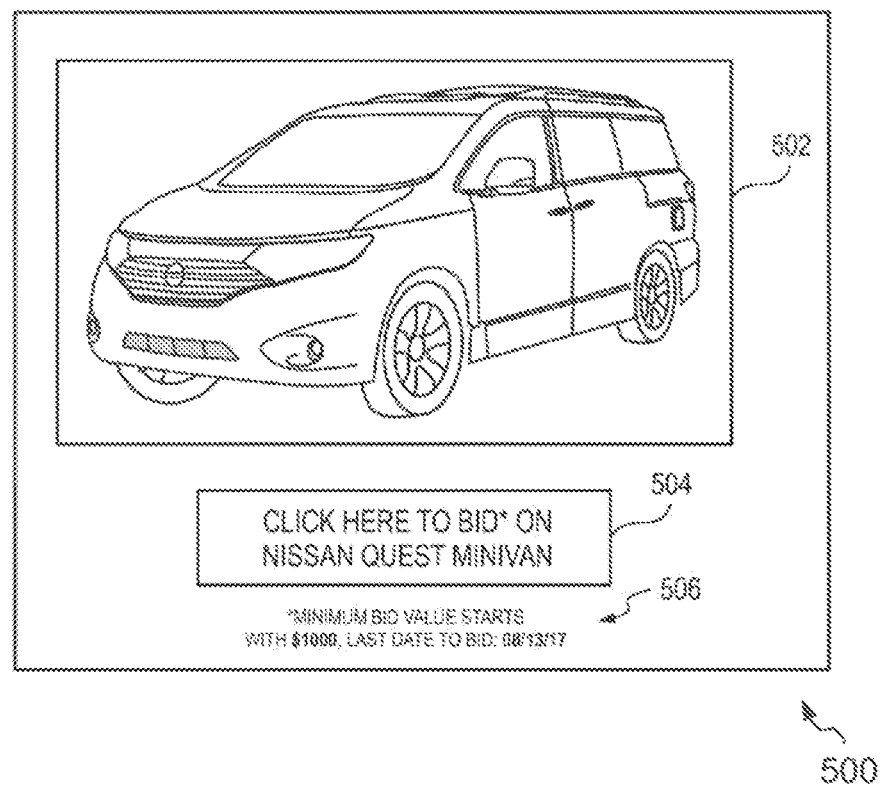
FIG. 5 shows an example representation of a UI for illustrating an online auctioning of the vehicle to be donated, in accordance with an example embodiment of the invention.

FIG. 5 shows an example representation of a UI 500 for illustrating an online auctioning of the vehicle donated, in accordance with an example embodiment of the invention. The UI 500 corresponds to a portion of a Web page associated with an entity facilitating online auctioning of vehicles. In an embodiment, the apparatus 102 may be configured to facilitate uploading of vehicle pictures and sharing of documents related to the vehicle to be donated on online auction sites. Moreover, as explained above, the apparatus 102 may determine a minimum bid price for the vehicle and specify the price on the auction site as depicted on UI 500. More specifically, the UI 500 depicts an image 502 of the vehicle to be donated along with a clickable button 504 displaying text 'Click here to bid* on Nissan Quest Minivan'. A postscript message 506 mentioning a minimum bid price of $1000 and last date to bid (exemplarily depicted as Aug. 31, 2017) is also depicted to be displayed below the button 504.

In an example embodiment, the bid value may be same as the net donation value computed for the vehicle to be donated. In some embodiments, the auctioning of the vehicle may be outsourced to a third party enterprise, which accepts used/donated vehicles and sells them within a predetermined price-range. It is noted that the vehicle may be auctioned to a range of prospective buyers, such as individual owners, private enterprises, car-rental services, and the like.

In an embodiment, the apparatus 102 may be configured to reconcile the transaction and append records subsequent to the sale of the vehicle. The apparatus may further be configured to transfer the funds to the campaign or cause for which the donor wished to donate funds to.

Figure 6:
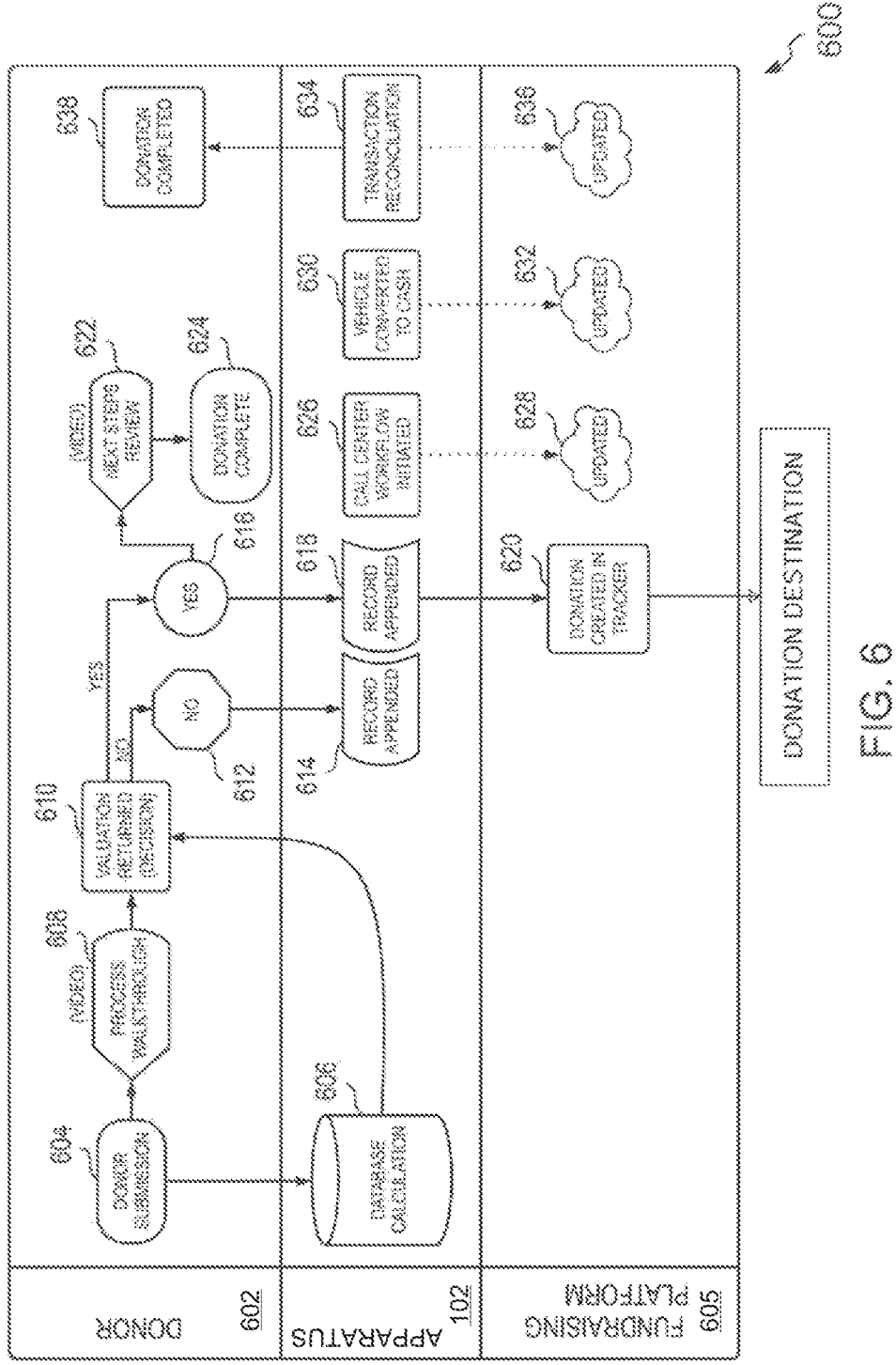
FIG. 6 shows an example process flow for facilitating online vehicle donation, in accordance with an example embodiment of the invention.

FIG. 6 shows an example process flow 600 for facilitating online vehicle donation, in accordance with an example embodiment of the invention. The process flow 600 outlines the various operations executed by the donor 602, the apparatus 102 and the fundraising platform 650. At 604 of the process flow 600, the donor 602 completes the donor submission process. More specifically, the donor 602 selects the option to donate a vehicle to a cause of choice, and thereafter provides the vehicle details on a UI, such as the UI 300 explained with reference to FIG. 3. Subsequent to providing all the details of the vehicle to be donated, the donor 602 selects the submit button to complete the donor submission process. At 606 of the process flow 600, the apparatus 102 receives the details of the vehicle and calculates the net donation value of the vehicle. The computation of the net donation value may be performed as explained with reference to FIG. 3 and is not explained again herein. At 608 of the process flow 600, the donor 602 is shown a video that walkthroughs the steps in donating the vehicle as well as answers common queries of the donors. At 610 of the process flow 600, the donor 602 receives the net donation value of the vehicle from the apparatus 102. The donor 602 is provided with an option to proceed with the donation of the vehicle or cancel the donation of the vehicle. If the donor 602 chooses not to donate the vehicle at 612 of the process flow 600, then the apparatus 102 appends the record in an internal database at 614. If the donor 602 chooses to donate the vehicle at 616 of the process flow 600, then the apparatus 102 appends the record in the internal database at 618 and the donor 602 is displayed another video outlining the next steps at 622 of the process flow 600. The donor involvement is then considered to be completed at 624 of the process flow 600. An entry may be created in a tracker of the fundraising platform 650 at 620 of the process flow 600 to register the donation of the vehicle by the donor 602.

The apparatus 102, as explained with reference to FIGS. 4 and 5, is configured to then initiate vehicle selling process. To that effect, the apparatus 102 may initiate the call center workflow at 626 of the process flow 600 with corresponding updates in the records of the fundraising platform 650 at 628. The apparatus 102 may facilitate auctioning of the vehicle and upon completion of the sale of the vehicle, complete the conversion of vehicle to cash at 630 of the process flow 600 with corresponding updates in the records of the fundraising platform 650 at 632. The apparatus 102 may thereafter reconcile the transaction (i.e. transfer the funds to the fundraising entity) at 634 of the process flow 600 with corresponding updates in the records of the fundraising platform 650 at 636. The donation of the vehicle may then be deemed complete upon the transfer of funds to the cause or campaign chosen by the donor 602, at 638 of the process flow 600.

Figure 7:
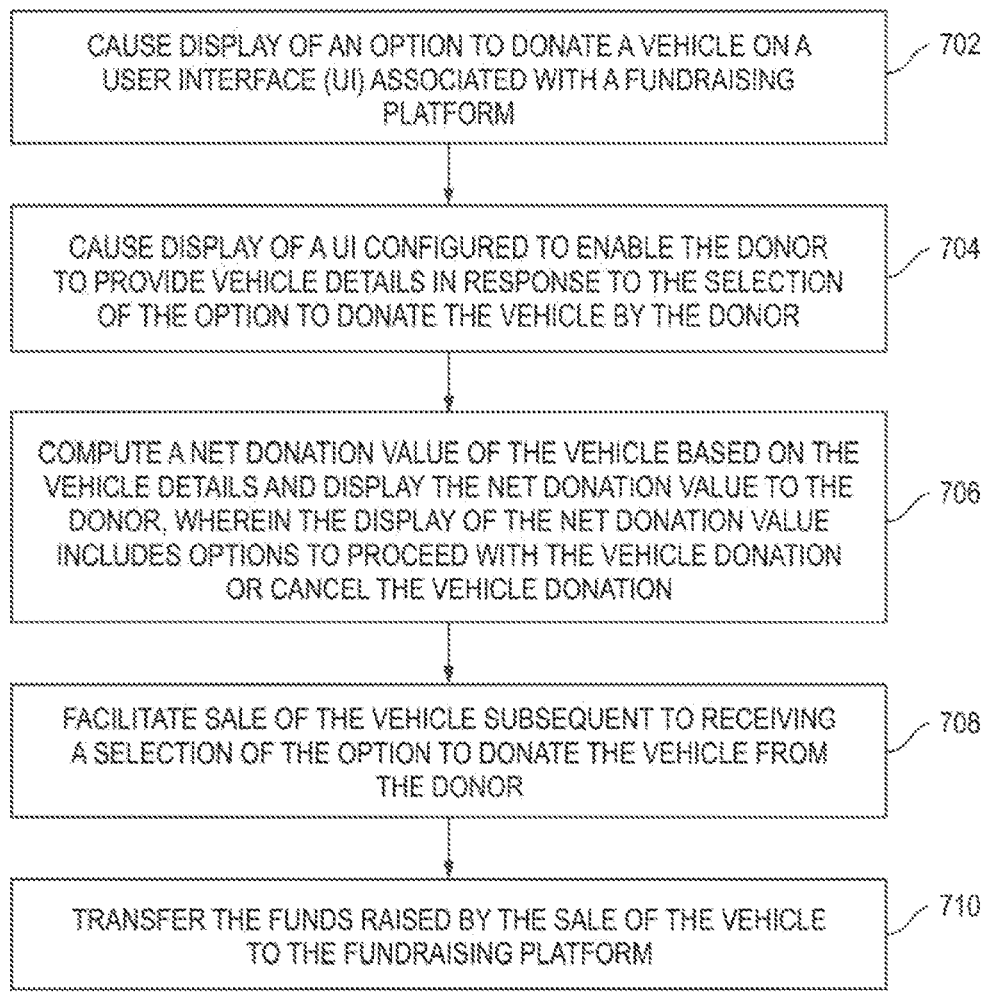
FIG. 7 is a flow diagram of a method for facilitating online vehicle donation in accordance with an example embodiment of the invention.

FIG. 7 is a flow diagram of a method 700 for facilitating online vehicle donation in accordance with an example embodiment. The various steps and/or operations of the flow diagram, and combinations of steps/operations in the flow diagram, may be implemented by, for example, hardware, firmware, a processor, circuitry and/or by the apparatus 102 of the present technology and/or by a different device associated with the execution of software that includes one or more computer program instructions. The method starts at operation 702.

At 702, display of an option to donate a vehicle is caused on a user interface (UI) associated with a fundraising platform. For example, a widget, such as the widget 250 may be displayed on the UI 200 of the crowd funding or other platform to provide the option to donate the vehicle.

At 704, display of a UI configured to enable the donor to provide vehicle details in response to the selection of the option to donate the vehicle by the donor is caused. For example, a UI such as the UI 300 explained with reference to FIG. 3 may be displayed to the donor to enable the donor to provide details related to the vehicle to be donated for a cause of choice. As explained with reference to FIGS. 1 and 2, an apparatus, such as the apparatus 102, may associate plugins and APIs, which may be activated upon selection of the option to donate the vehicle by the donor. The API calls may cause the apparatus to display an UI enabling the donor to provide details of the vehicle.

At 706, a net donation value of the vehicle is computed based on the vehicle details and displayed to the donor. The display of the net donation value includes options to proceed with the vehicle donation or cancel the vehicle donation. The computation of the net donation value and the display of options may be performed as explained with reference to FIG. 4 and is not explained again herein.

At 708, the sale of the vehicle is facilitated subsequent to receiving a selection of the option to donate the vehicle from the donor. In at least one example embodiment, the sale of the vehicle may be facilitated through auction sites as explained with reference to FIG. 5.

At 710, funds raised by the sale of the vehicle are transferred to the fundraising platform to complete the online vehicle donation process. The method 700 ends at 710.

Figure 8:
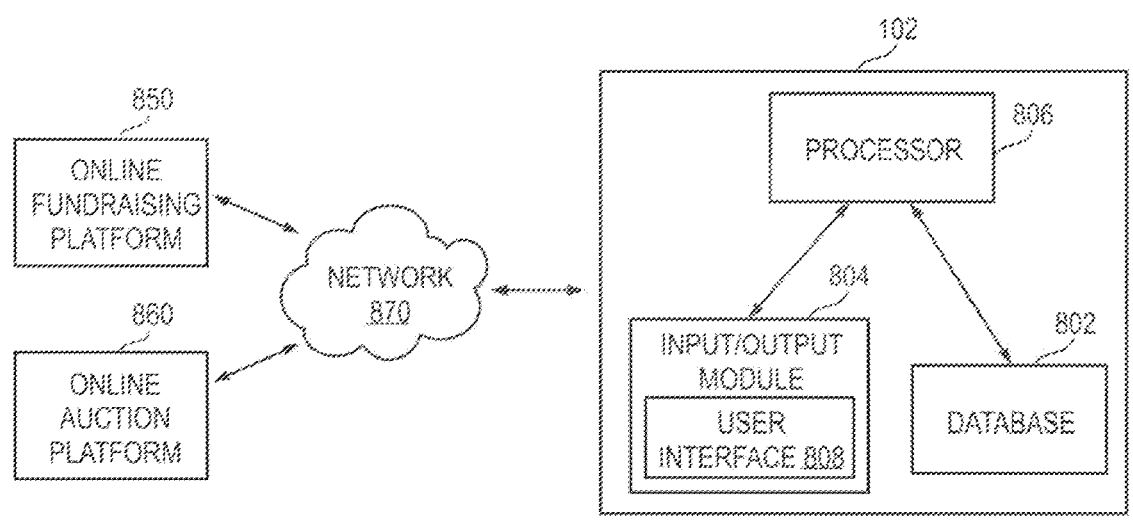
FIG. 8 illustrates a block diagram representation of the apparatus capable of implementing the various embodiments of the present invention.

FIG. 8 illustrates a block diagram representation of the apparatus 102 capable of implementing the various embodiments of the present invention. The apparatus is depicted to include a database 802, an input/output (I/O) module 804 and at least one processor 806 for facilitating online vehicle donation. In at least one embodiment, the apparatus 102 may be embodied as a server accessible through a communication network, such as the network 150.

The processor 806 is communicably coupled with the database 802 and the I/O module 804. The processor 806 is capable of executing the stored machine executable instructions in the database 802 or within the processor 806 or any storage location accessible to the processor 806. The processor 806 is configured to perform the various operations as explained with reference to method 700. For example, the processor 806 is configured to cause display of an option to donate the vehicle on a UI of a fundraising platform, receive selection of the option by the donor, cause display of a UI enabling the donor to input vehicle details, compute the net donation value of the vehicle, display the net donation value of the vehicle to the donor, facilitate in selling of the vehicle (for example, by online auctions or otherwise) and transfer the funds raised by selling the vehicle to the fundraising platform. The processor 806 may be embodied in a number of different ways. In an embodiment, the processor 806 may be embodied as one or more of various processing devices, such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

The database 802 is a storage device embodied as one or more volatile memory devices, one or more non-volatile memory devices, and/or a combination of one or more volatile memory devices and non-volatile memory devices, for storing micro-contents information and instructions. The database 802 may be embodied as magnetic storage devices (such as hard disk drives, floppy disks, magnetic tapes, etc.), optical magnetic storage devices (e.g., magneto-optical disks), CD-ROM (compact disc read only memory), CD-R (compact disc recordable), CD-R/W (compact disc rewritable), DVD (Digital Versatile Disc), BD (BLU RAY® Disc), and semiconductor memories (such as mask ROM, PROM (programmable ROM), EPROM (erasable PROM), flash ROM, RAM (random access memory), etc.).

The database 802 may be configured to store the platform instructions for the processor 806 to execute for facilitating online vehicle donations. The database 802 may also maintain most recent transaction data fetched from various data sources, such as the data sources explained with reference to FIG. 3. The database 802 may also include algorithms, such as algorithms for computing the vehicle donation value from the transaction data, for determining the minimum bid price, and the like.

In an embodiment, the I/O module 804 may include mechanisms configured to receive inputs from and provide outputs to the user of the apparatus 102. To that effect, the I/O module 804 may include at least one input interface and/or at least one output interface. Examples of the input interface may include, but are not limited to, a keyboard, a mouse, a joystick, a keypad, a touch screen, soft keys, a microphone, and the like. Examples of the output interface may include, but are not limited to, a UI display such as User Interface 808 (such as a light emitting diode display, a thin-film transistor (TFT) display, a liquid crystal display, an active-matrix organic light-emitting diode (AMOLED) display, etc.), a microphone, a speaker, a ringer, a vibrator, and the like. In an embodiment, a user of the apparatus 102 may utilize their respective electronic devices to access the user interface 808 of the I/O module 804 and interact with the apparatus 102. The I/O module 804 may further include a communication interface capable of facilitating operative communication with one or more fundraising platforms, such as the online fundraising platform 850, and one or more online auctioning platforms, such as an online auction platform 860, using API calls. The communication may be achieved over a communication network, such as network 870, to facilitate online vehicle donation as explained with reference to FIGS. 1 to 7.

Figure 9:
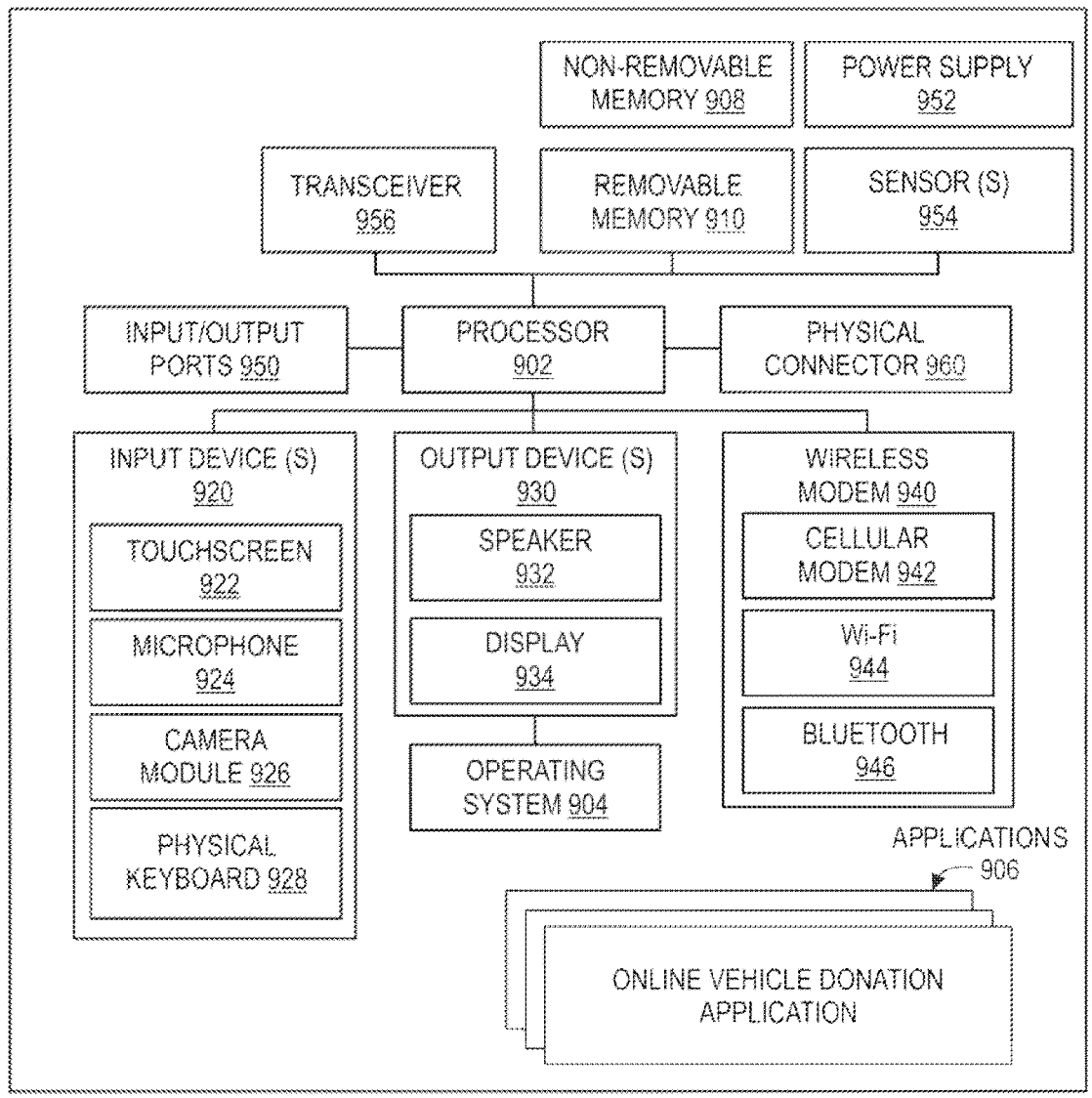
FIG. 9 and FIG. 10 illustrate a computing device capable of implementing the various embodiments of the present invention.
Figure 10:
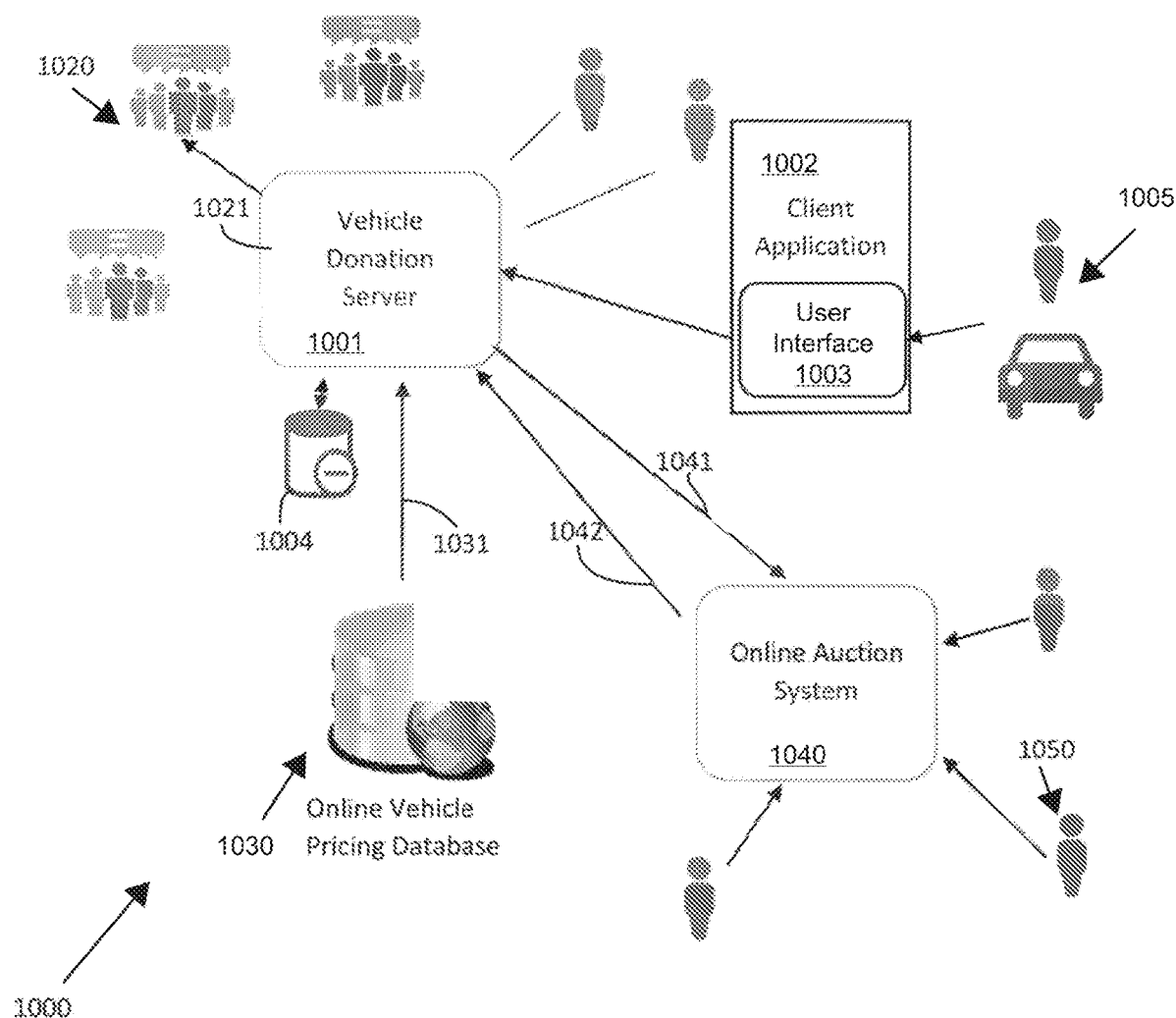

FIG. 9 illustrates a computing device 900 capable of implementing the various embodiments of the present invention. In an embodiment, the various operations performed by the apparatus 102 may be implemented using an application in a computing device, such as the computing device 900. For example, the computing device 900 may correspond to a device corresponding to a fundraising entity or a device corresponding to a donor. The computing device 900 is depicted to include one or more applications 906, including an application for online vehicle donation, which serves as an instance of the application downloaded from the apparatus 102 and capable of communicating through API calls with the apparatus 102 to facilitate online vehicle donation.

It should be understood that the computing device 900 as illustrated and hereinafter described is merely illustrative of one type of device and should not be taken to limit the scope of the embodiments. As such, it should be appreciated that at least some of the components described below in connection with that the computing device 900 may be optional and thus in an example embodiment may include more, less or different components than those described in connection with the example embodiment of the FIG. 9. As such, among other examples, that the computing device 900 could be any of a mobile electronic devices, for example, cellular phones, tablet computers, laptops, mobile computers, personal digital assistants (PDAs), mobile televisions, mobile digital assistants, or any combination of the aforementioned, and other types of communication or multimedia devices.

The illustrated computing device 900 includes a controller or a processor 902 (e.g., a signal processor, microprocessor, ASIC, or other control and processing logic circuitry) for performing such tasks as signal coding, data processing, image processing, input/output processing, power control, and/or other functions. An operating system 904 controls the allocation and usage of the components of the computing device 900 and support for one or more applications programs (see, applications 906), such as online vehicle donation application, that implements one or more of the innovative features described herein. In addition to online vehicle donation application, the applications 906 may include common mobile computing applications (e.g., telephony applications, email applications, calendars, contact managers, web browsers, messaging applications) or any other computing application. The online vehicle donation application, in at least one example embodiment, may be configured to provide the logic to facilitate online vehicle donation, as explained with reference to FIGS. 1 to 5.

The illustrated computing device 900 includes one or more memory components, for example, a non-removable memory 908 and/or removable memory 910. The non-removable memory 908 can include RAM, ROM, flash memory, a hard disk, or other well known memory storage technologies. The removable memory 910 can include flash memory, smart cards, or a Subscriber Identity Module (SIM). The one or more memory components can be used for storing data and/or code for running the operating system 904 and the applications 906.

The computing device 900 can support one or more input devices 920 and one or more output devices 930. Examples of the input devices 920 may include, but are not limited to, a touch screen 922 (e.g., capable of capturing finger tap inputs, finger gesture inputs, multi-finger tap inputs, multi-finger gesture inputs, or keystroke inputs from a virtual keyboard or keypad), a microphone 924 (e.g., capable of capturing voice input), a camera module 926 (e.g., capable of capturing still picture images and/or video images) and a physical keyboard 928. Examples of the output devices 930 may include, but are not limited to a speaker 932 and a display 934. Other possible output devices (not shown in the FIG. 9) can include piezoelectric or other haptic output devices. Some devices can serve more than one input/output function. For example, the touchscreen 922 and the display 934 can be combined into a single input/output device.

The present invention may request that the user take and upload a plurality of images of the present donation. In some embodiments, the plurality of images may comprise at least 6 images. This may enable the present invention to view the donated car and allows for better marketing of the asset online. The plurality of images accepted may comprise an image of each of the 4 corners of the car, the odometer of the car, the VIN plate (dash or door jamb), and additional images of damages, etc.

A wireless modem 940 can be coupled to one or more antennas (not shown in the FIG. 9) and can support two-way communications between the processor 902 and external devices, as is well understood in the art. The wireless modem 940 is shown generically and can include, for example, a cellular modem 942 for communicating at long range with the mobile communication network, a Wi-Fi compatible modem 944 for communicating at short range with an external Bluetooth-equipped device or a local wireless data network or router, and/or a Bluetooth-compatible modem 946. The wireless modem 940 is typically configured for communication with one or more cellular networks, such as a GSM network for data and voice communications within a single cellular network, between cellular networks, or between the computing device 900 and a public switched telephone network (PSTN).

The computing device 900 can further include one or more input/output ports 950, a power supply 952, one or more sensors 954 for example, an accelerometer, a gyroscope, a compass, or an infrared proximity sensor for detecting the orientation or motion of the computing device 900, a transceiver 956 (for wirelessly transmitting analog or digital signals) and/or a physical connector 960, which can be a USB port, IEEE 1294 (FireWre) port, and/or RS-232 port. The illustrated components are not required or all-inclusive, as any of the components shown can be deleted and other components can be added.

The present invention features a method for processing a title of a vehicle. Donors may be asked to take a photo of the title to their proposed donation and upload it to the 'Vehicle' tab. The processor may execute computer instructions to 'read' (optical character recognition/OCR) all text in the image, which may comprise the alphanumeric 17-digit VIN number, recognize the state origin, confirm if a lienholder exists (or confirm properly released), document license plate, and see exactly how the title is currently held. Upon completion of the above, the system may return to the donor a copy of the title image with a graphical 'overlay' onto the image guiding the donor exactly how and where to sign the title before sending it in. This title processing method may confirm that the donor has the title. Furthermore, 17-digit VIN numbers are frequently mistyped by donors which may cause delays, and accurate VIN numbers may enable confirmation of the year, make and (occasionally) model information. Knowing the state origin is of great importance, and a missing or incorrect lienholder release can be a dealstopper. Understanding how title is currently held is paramount in avoiding signing errors, a donor incorrectly signing their title may cause a minimum of a 45-day delay in processing. The title processing method may confirm age of vehicle enabling the present invention to determine if the mileage field needs to be completed (a frequent area for errors). This capability may avert a majority of issues typically faced saving time, money and creating a smoother donation experience.

Various embodiments of the present technology provide a method and apparatus that enable donors to donate their vehicles and contribute the fund raised to their desired fundraising entity. Further, the vehicle donation process, as described herein, is a completely online process, which reduces an amount of effort required in selling a vehicle and in raising donations through vehicle donation. Fundraising platforms, like crowdfunding platforms have several millions of monthly users visiting their sites with the intention to support (for example, by way of donation) any number of causes running campaigns on these platforms. The present invention provides these donors the option of donating a vehicle (such as car, bike, moped, speedboat, etc.) to support any cause they wish to support. The present technology enables increased collection of funds for fundraising entities and eliminates the problems associated with selling of the vehicle by the donor himself/herself to donate the money to the fundraising entities.

One of the differentiators from the prior art of the present invention is the ability to provide the service to fundraising platforms like GoFundMe Charity, Donor Choose, etc. Providing these platforms a source of revenue in this manner is a major improvement and something entirely unique to the present invention and not contemplated in any prior references. A representation of the conversion of a car into a donation that is then distributed by the fundraising platform is depicted in FIG. 6. In an effort to help individual charities succeed, the present invention may offer a toolkit through their profile when logged in that provides best practices, success examples, social post examples, and graphics both generic and personalized (utilizing their uploaded logo). Charities may additionally be provided a marketplace of value that they may subscribe to through their profile. The marketplace may comprise social media services (graphics, posts, calendar management, etc.), ads managed through our partner agency, and other programs to be developed as informed by the market. In some embodiments, AI and machine learning may be implemented in determining which sale path may garner the highest return to charities (highest sale price, lowest fees, fastest turn-around, etc.).

Another differentiator from prior references is that the present invention fully discloses all projected figures AND related impact up front. This is unique, as prior references merely contemplate providing an accounting breakdown AFTER the donation is processed. The present invention provides an estimate upfront AND a dosing statement that not only discloses all figures at completion of donation, but compares them to the previous projected figures. The present invention may provide donors their tax forms completely on demand. The present invention may additionally enable donors to split proceeds among multiple entities. The present invention may additionally offer a cash-back capability.

Another differentiator from prior references is that the present invention is capable of measuring a social impact of a donation upon proposition of the said vehicle donation.

In some embodiments, vehicle values may be derived by calculations from a plurality of market sources (Kelley Blue Book, Manheim Market Value, Insurance Auto Auctions, Black Book, JD Power, NADA Guides etc. This may derive more trust from users of the accuracy of the valuations of vehicles.

The embodiments illustrated and described herein as well as embodiments not specifically described herein but within the scope of aspects of the invention constitute exemplary system means for facilitating online vehicle donation. For example, the elements illustrated and described with reference to FIGS. 1 to 5, when configured, under control of the processor, such as the processor 806 and computer program code in the database 802 to perform the operations illustrated and described with reference to FIGS. 1 to 5, constitute means for causing display of an option to donate a vehicle on a user interface (UI) associated with a fundraising platform; means for causing display of a UI configured to enable the donor to provide vehicle details in response to the selection of the option to donate the vehicle by the donor; means for computing a net donation value of the vehicle based on the vehicle details and displaying the net donation value to the donor, wherein the display of the net donation value includes options to proceed with the vehicle donation or cancel the vehicle donation; means for facilitating the sale of the vehicle subsequent to receiving a selection of the option to donate the vehicle from the donor; and means for transferring funds raised by the sale of the vehicle to the fundraising platform.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the apparatus 102 and its various components, such as the processor 806, the database 802 and the I/O module 804 may be enabled using software and/or using transistors, logic gates, and electrical circuits (for example, integrated circuit circuitry such as ASIC circuitry). Various embodiments of the invention may include one or more computer programs stored or otherwise embodied on a computer-readable medium, wherein the computer programs are configured to cause a processor or computer to perform one or more operations (for example, operations explained herein with reference to FIG. 7). A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (BLU RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The processor 806 of the present invention may be capable of calculating impact metrics using a plurality of impact blocks provided by each charitable organization of a plurality of charitable institutions (1020). The impact metrics may comprise an impact of a potential donation on the charitable organization receiving the potential donation. The client application 1002 may be capable of displaying the calculated impact metrics. For example, the client application 1002 may display a message stating "Your donation of [net donation value] is going to help [charity name] feed 215 homeless individuals."

In some embodiments, components of the present invention may be stored on a cloud computing system, a hosted server, or any similar remotely-accessed external storage system.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The exemplary embodiment was chosen and described in order to best explain the principles of the present disclosure and its practical application, to thereby enable others skilled in the art to best utilize the present disclosure and various embodiments with various modifications as are suited to the particular use contemplated.

What is claimed is:
1. A system (1000) for facilitating the donation of vehicles to charitable causes, comprising:
 a. a server (1001), comprising:
  i. a database (1004), comprising:
   data about a plurality of charitable institutions (1020), including bank account information to which funds from donated vehicles may be transferred, and
   data about a plurality of donated vehicles (1005), including the intended charity they were donated to, the user who donated them, and an estimated value,
  ii. a processor capable of executing computer instructions configured to execute computer implemented instructions comprising:
   instructions for accepting an uploaded picture of a title for the vehicle from a user,
   instructions for autonomously identifying an alphanumeric 17-digit vehicle identification number (VIN) in the uploaded picture of the title,
   instructions for decoding the VIN to determine a make and a model of the vehicle,
   instructions for verifying that the make and the model of the vehicle match the decoded VIN,
   instructions for displaying, if the make and the model of the vehicle is verified, the uploaded picture of the title to the user with a graphical overlay directing the user to sign the title in a correct place,
   instructions for interfacing with at least one online vehicle pricing system (1030) to determine an estimated value for the vehicle (1031),
   instructions for calculating a net donation value of the vehicle,
   instructions for calculating impact metrics using a plurality of impact blocks provided by each charitable institution of the plurality of charitable institution (1020), wherein the impact metrics comprise an impact of a potential donation on the charitable institution,
   instructions for interfacing with an online vehicle auction system (1040) to post a vehicle for sale (1041),
   instructions for accepting payment from an online vehicle auction system (1042), and
   instructions for transferring funds to the bank account of the designated charity (1021),
  wherein the server (1004) is held in a physical computing system, a cloud computing system, or a hosted server, and
 b. a client application (1002), operatively connected to the server via a network, comprising a user interface (1003) comprising:
  i. means for the user (1010) to enter information about a vehicle (1005) to be donated,
  ii. means for displaying a net donation value of the vehicle,
  iii. means for displaying the impact of the potential donation on the charitable institution,
  iv. means for accepting confirmation or cancellation of the vehicle donation, and
  V. means for a user to specify a designated charity to donate the vehicle to,
  wherein when a user (1010) enters information about a vehicle (1005) in the user interface (1003), the client (1002) sends the information about the vehicle to the server (1001), where it is added to the database

(1004), whereupon the server communicates with one or more vehicle online pricing systems (1030) to estimate a value for the vehicle, wherein the value is entered into the database, wherein the server computes an estimated donation value after accounting for transportation and other costs, wherein the estimated donation value is displayed to the user, wherein the server computes impact metrics for the potential donation, wherein the impact metrics are displayed to the user, wherein the user may choose to confirm or cancel the donation, wherein if the user confirms the donation, the server communicates with an online auction system (1040) to post the vehicle for sale (1041), wherein buyers (1050) may bid on the vehicle, wherein when or if the vehicle is sold, funds are transferred from the auction website (1042) to the bank account of the designated charity (1021), wherein the online auction system arranges for third party entities to transfer the vehicle from the donor to the buyer.

\* \* \* \* \*